United States Patent [19]

Siclari et al.

[11] 4,083,833
[45] Apr. 11, 1978

[54] METHOD FOR THE PRODUCTION OF CELLULOSIC FIBRES HAVING A HIGH RESISTANCE TO COMBUSTION, AND TEXTILE PRODUCTS PREPARED BY SAID METHOD

[75] Inventors: Francesco Siclari, Barlassina; Pietro Paolo Rossi, Garlasco; Roberto Leoni, Milan; Mario De Gaetano, Seregno, all of Italy

[73] Assignee: SNIA VISCOSA Societa Nazionale Industria Applicazioni Viscosa S.p.A., Italy

[21] Appl. No.: 703,592

[22] Filed: Jul. 8, 1976

[30] Foreign Application Priority Data

Jul. 11, 1975 Italy .................. 25283 A/75

[51] Int. Cl.$^2$ .............. C08F 28/00; C08F 30/02; C08F 230/02; C08F 4/27
[52] U.S. Cl. .............. 260/79.3 MU; 260/2 P; 260/17.4 CL; 526/232; 526/275
[58] Field of Search ....... 260/2 P, 79.3 MU, 17.4 CL; 106/15 FP, 165, 168; 526/275, 276

[56] References Cited

U.S. PATENT DOCUMENTS

| | | | |
|---|---|---|---|
| 3,329,663 | 7/1967 | Allcock et al. | 526/275 |
| 3,455,713 | 7/1969 | Godfrey | 106/105 |
| 3,645,936 | 2/1972 | Gardner | 106/168 |
| 3,676,311 | 7/1972 | Frank | 260/2 P |
| 3,732,683 | 5/1973 | Feller | 106/165 |
| 3,840,621 | 10/1974 | Franko-Filipasic et al. | 106/168 |
| 3,865,604 | 2/1975 | Riedel et al. | 106/108 |
| 3,883,451 | 5/1975 | Reynard et al. | 260/2 P |
| 3,891,448 | 6/1975 | Braxton et al. | 106/15 FP |
| 3,917,802 | 11/1975 | Allcock et al. | 260/2 P |
| 3,947,276 | 3/1976 | Siclari et al. | 106/15 PF |

*Primary Examiner*—Herbert J. Lilling
*Attorney, Agent, or Firm*—McGlew and Tuttle

[57] ABSTRACT

There is described the preparation of a flameproofing compound useful in the production of cellulosic fibres having a high resistance to combustion, said preparation comprising treating a phosphonitrile halide with a saturated alcohol, treating the halogen containing alkoxy derivative thus obtained with an unsaturated alcohol, and copolymerizing the alkyl substituted alkoxy derivative product thus obtained with an unsaturated acid, forming an alkaline aqueous solution-suspension adapted to be easily and intimately mixed with alkaline aqueous solutions of cellulose xantogenate to obtain a viscous mass of cospinnable components which are co-coagulable in a cellulose xantogenate coagulating bath. Obtaining essentially homogeneous yarns including the flameproofing compound in their cross-sections.

13 Claims, 1 Drawing Figure

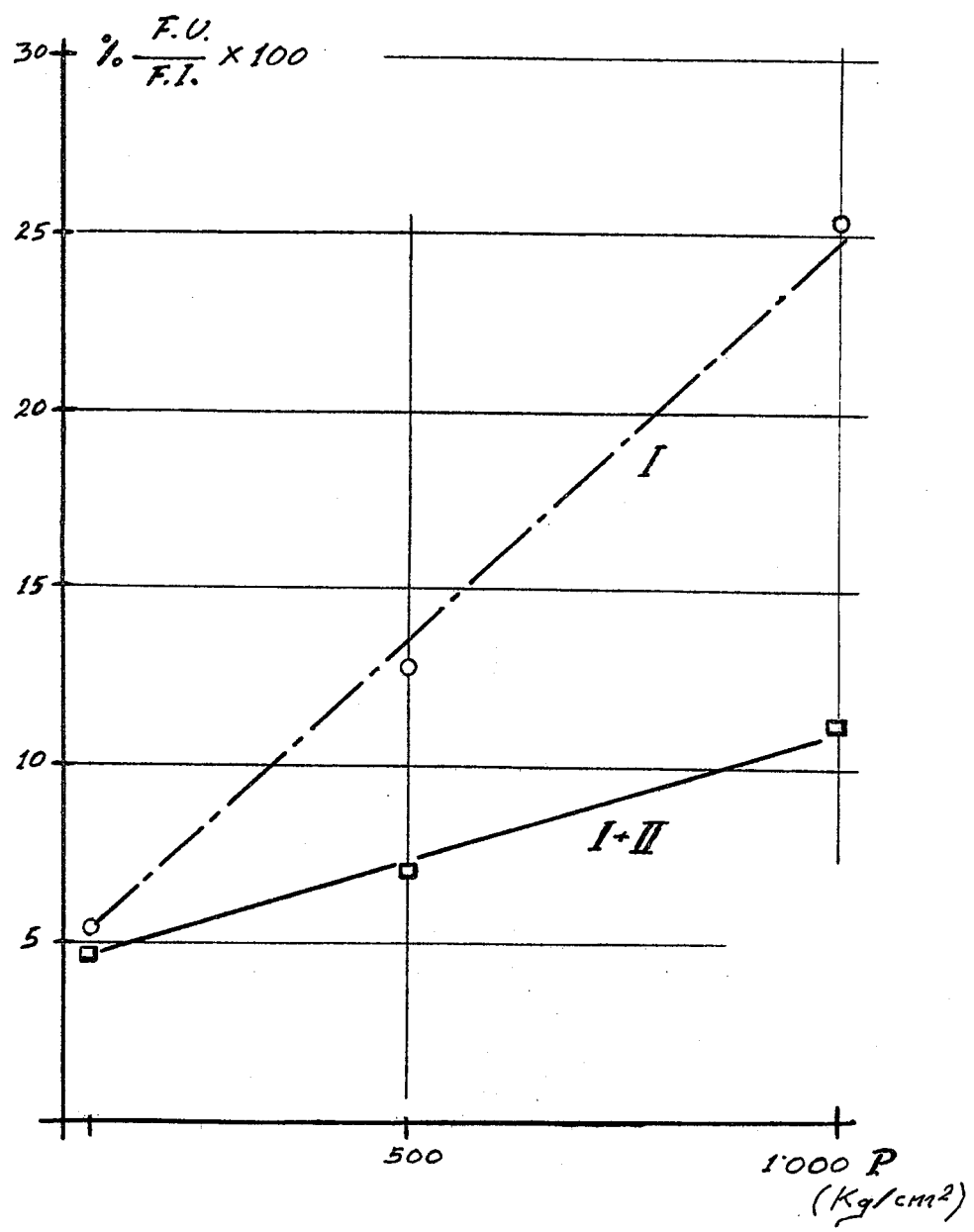

METHOD FOR THE PRODUCTION OF CELLULOSIC FIBRES HAVING A HIGH RESISTANCE TO COMBUSTION, AND TEXTILE PRODUCTS PREPARED BY SAID METHOD

BACKGROUND OF THE INVENTION

1. Field of the Invention

This invention relates to an improved method for preparing filaments and fibres of a prevalently cellulosic nature and more precisely filaments and fibres (and textile products made of said filaments and fibres) of regenerated cellulose (viscose rayon) produced by wet spinning in an acid bath alkali-cellulose treated with carbon sulfide, which filaments, fibres and other products exhibit a high resistance to combustion and when maintained under conditions of incandescence.

2. Description of the Prior Art

Many attempts have been made in the art to improve the resistance to combustion of textile products made of rayon viscose fibres, and various techniques have been proposed and industrially adopted for this purpose. The large number of patent and technical publications concerning such techniques makes it unnecessary to describe them in detail, except insofar as this may be useful to the understanding of this invention. Therefore no reference to techniques involving the application of flame proofing additives to the surface of cellulosic yarns or to fabrics made therefrom and the penetration of said agents to some extent into said products.

The improvement which forms the object of this invention relates to the method for introducing the flame proofing additive (generally a compound or a combination of compounds containing phosphorus and nitrogen) into the spinnable viscose dope prior to spinning it and even immediately before this, viz, in correspondence of the spinning nozzles, whereby the flame proofing additive becomes more or less homogeneously dispersed throughout the cross-section of the resulting fibres. Some of these techniques comprise the use of liquid additive which are insoluble in the dope (see for instance U.S. Pat. No. 3,455,713) or the use of solid or semi-solid additives, in particles of microscopic dimensions, also insoluble in the dope (see for instance U.S. Pat. No. 3,645,936).

An important progress in the art has been provided by the applicant through the invention described and claimed in previous Italian Pat. No. 969954 (which corresponds to Belgian Pat. No. 806504 and to patent application publication Nos. 73.38109 in France and F 23 53 821.8 in Germany), which patents and publications are incorporated herein by reference, and which, among other things, critically and analytically describe the previous state of the art.

In said previous proposal of the applicant, an advantageous operating procedure had been disclosed, according to which a compound of phosphorus and nitrogen is dissolved in an amount of the aqueous solvent of the cellulose xantogenate, under correspondingly alkaline conditions, so that it becomes "cospinnable" with the viscose and constitutes therefore with said viscose, a spinnable dope which is at least physically homogeneous. Further, said compound becomes solid in the spinning and coagulating bath through a process parallel to the regeneration of the cellulose and gives rise into insoluble submicroscopic particles dispersed and stably bound in the cross-sections of fibre produced, so that it is practically impossible to extract them even by the most severe and repeated mechanical and chemical treatments, such as repeated washings, and so forth.

Said previous proposal of the applicant has been carried into practice and industrially applied by using as the flame proofing compound, tetra-kishydroxymethylphosphonium chloride, added to the viscose dope in the form of an alkaline aqueous solution, preferably including carbon sulphide and brought to a pH close so that of the cellulose xantogenate solution.

The resulting composite dope, consisting of cospinnable and co-coagulatable cellulosic and phosphonic components, produces fibres having the most desirable properties, which are not attained concurrently by any other means known in the art of high resistance to combustion, stability of said resistance in time, under treatments and in use, and luster and substantial trasparence equal to that of a normal fibre.

The aforesaid phosphonic compound however has the serious and industrially highly relevant drawback, of being very costly and complicated to prepare and is therefore limited to use for special productions and for the manufacture of highly priced products, such as artificial furs, and a few others.

Other known flame proofing additives and compounds, for instance those in which the base phosphorus compound is a halide, in particular a phosphonitrile chloride, which are available and can be manufactured more economically, are not suited, as far as is known in the art, to be added to the spinning dope to form, as the aforesaid previous invention requires, an essentially homogeneous mixture of cospinnable and co-coagulatable cellulosic and phosphonic components, capable of becoming insoluble the wet spinning, through parallel chemical transformations.

SUMMARY OF THE INVENTION

Now then, it is a purpose of this invention to provide an improved method for producing fibres having all the aforesaid desired properties by using economical flame-proofing compounds, typically phosphonitrile chloride. According to the invention, the flame proofing compound is chemically transformed into an insoluble compound which is essentially solid or in the form of a highly viscous liquid (practically, a semi-solid paste) and which is also capable of forming an alkaline aqueous solution suspension adapted to be easily mixed with alkaline-aqueous cellulose xantogenate solutions to a dope consisting of cospinnable and co-coagulatable components.

In its broadest definition, the improved method essentially comprises the steps of a. chemically transforming a compound which will be called "base flame proofing compound", in particular an alkoxy derivative of a phosphonitrile halide (hereinafter designated as "A") to obtain a monomeric copolymerizable compound, which in turn will be designated as "I";

b. copolymerizing said monomeric compound "I" with an unsaturated acid, designated hereinafter as "II", in particular a carboxylic or sulphonic acid, whereby to obtain a water insoluble copolymeric compound "I+λ II", having a higher molecular weight and comprising carboxylic or sulphonic groups;

c. treating said polymer with an alkaline solution, so as to form salt bonds with said carboxylic or sulphonic groups of said polymer "I+II", and to obtain a fluid mass which yields, with water, a solution-suspension easily mixable with cellulose xantogenate solutions;

d. adding said solution-suspension to the spinnable viscose dope, whereby there is obtained a composite dope consisting of cospinnable compounds which are rendered insoluble in the spinning bath and regenerated cellulose fibres including in their cross-sections the said insoluble copolymer "I+II".

According to s specific embodiment of the invention, the base flame proofing compound "A" is a cyclic compound obtained by reacting according to the art phosphonitrile halide (PN Hal$_2$)$_n$, in particular phosphonitrile chloride (PNCl$_2$)$_n$, which is a mixture, in variable proportions, of compounds having the same general formula, wherein "n" is a whole number from 3 to 10, wherein in general the homolog in which $n=3$ represents at least 30% and preferably 50% or more of the said mixture, and which is also known as halogenated phosphazene, with a saturated alcohol such as propyl or butyl alcohol, whereby at least one halogen atom remains free (not substituted) in each ring of the cyclic phosphonitrile halide. Considering by way of example phosphonitrile chloride with $n=3$ (or as specified hereinbefore), compounds for instance of the following type are obtained from this first substitution:

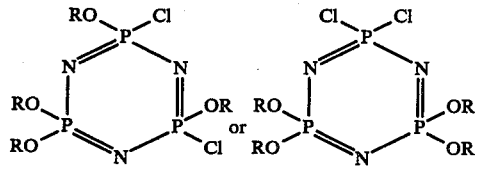

which for the sake of brevity will be designated respectively as compounds of the type "C/1" or of the type "C/2". The R group in the formulae stands for alkyl, e.g. propyl or butyl.

As will be noted, chlorine has been exemplified as the halogen. As a matter of fact, the use of chlorine as the preferred halogen is traditional in the art, prevalently for economical reasons. Therefore in the following embodiments of invention chlorine will be used as the halogen, but this is not intended as a limitation and the invention is not in fact limited to the use of chlorine.

Subsequently, the alkoxy halide derivative obtained, for instance alkoxy chlorophosphonitrile thus obtained is reacted with an unsaturated alcohol, such as allyl alcohol, so as to obtain compounds (hereinafter also defined as "monomeric compound I") of the type (always assuming by way of example that $n=3$)

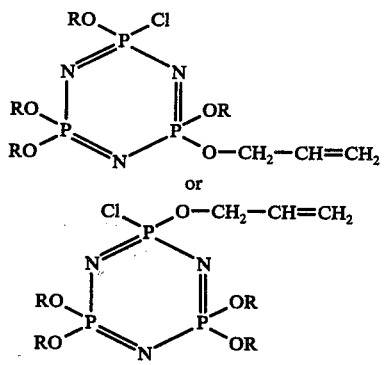

which will also be indicated respectively as "type CB/1" and "CB/2".

In the formulae the substitution ratios of the halogen in this reaction have been exemplified as 1:1, but they could be different.

The alkenyl-substituted compound thus obtained is reacted as stated hereinbefore, with an unsaturated acid. As the unsaturate carboxylic or sulphonic acid (monomeric compound "II"), for carrying out Step (b), one may use e.g. maleic acid

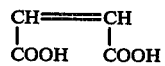

or acrylic acid

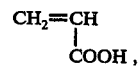

or methacrylic acid

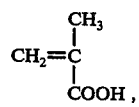

or allylsulphonic acid

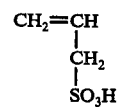

Polymerization Step (b) is carried out by using one or more of the products "I", with the addition in suitable proportions of one of the unsaturated carboxylic acids (comonomers "II") and of a normal polymerization catalyst such as benzoyl peroxide. The products obtained from the copolymerization of "I+II" are semi-solid oils which are added to the alkaline solutions of cellulose xantogenate as alkali salts, whereby when said mixture is subsequently spun in an acid coagulating bath, both the cellulose and the flame proofing agent are regenerated, this latter in the form of a carboxylic or sulphonic acid.

Monomer "I" even taken alone has flame proofing properties. Similar products are used as flame retardants in cellulosic fibres (see for instance U.S. Pat. No. 3,455,713 already cited and also French Pat. No. 2012440), however said compound or compounds migrate in the fibre and can be extracted with chlorinated solvents when they are not bound within a more complex structure.

The extraction with CHCl$_3$ is illustrated in Table 1 hereunder, which lists tests effected on cellulosic fibres to which compound "I" and the compound derived from the copolymerization of "I" with "II" have been added.

The following Table 1 may be considered indicative with reference to all the compatible examples hereinafter described.

Table 1

| Product | Initial % of P in the fibre | Solvent | Number of extraction cycles in SOXHLET | Final % of P in the fibre | % of extract |
|---|---|---|---|---|---|
| "I": R=$CH_3$—$CH_2$—$CH_2$—$CH_2$— spun fibre | 4.23 | $CHCl_3$ | 15 | 1.71 | 60.5 |
| Copolymer "I+II" R=$CH_3$—$CH_2$—$CH_2$—$CH_2$— spun fibre | 2.53 | $CHCl_3$ | 15 | 2.48 | 6.2 |
| Copolymer "I+II" R=$CH_3$—$CH_2$—$CH_2$—$CH_2$— continuous filament | 2.77 | $CHCl_3$ | 15 | 2.72 | 1.4 |

It is to be noted that both the compound indicated by "I" and the compound indicated by "I+II" are resistant to repeated washings with 95% solution of alkaline soaps, according to norms ISO/R105/1V-1968 (F).

The migration of the product in the fibre has been shown by the following experiment; a weighed tuft of fibres is placed between two filter paper discs, then the test sample thus prepared is placed in a press and is subjected to a predetermined pressure for 1 minute. The filter paper discs are then burnt and the amount of phosphorus in the ashes is determined. The pressure exerted is varied and the variation of the migration of the flame proofing agent from the fibre to the filter paper is observed. Of course this test only serves to evidence the migration phenomenon. The tests have been carried out at room temperature; the phosphorus in the ashes is expressed as a percentage of the phosphorus contained in the fibre tuft.

In the diagram the ordinate represents the weight ratios between the amount of phosphorus which has "come out" (F.U.) and the "initial" phosphorus (F.I.). It is seen from the curve (which has been made into a straight line, for the sake of simplicity, by suitable modifying the abscissa representing the pressures) indicated as "I+II", that the compound according to the invention migrates only to an acceptable degree, whereas compound "I" migrates to a considerable extent.

Some examples and embodiments of the method according to this invention will now be described. The results are marked on the diagram which is attached as FIG. 1 and in Table 2.

DESCRIPTION OF THE PREFERRED EMBODIMENTS

EXAMPLE 1

Step (a)

Preparation of n-butoxy-chlorophosphazene

The products obtained from the reaction about to be described are alkoxy-substituted cyclic products which can be of the types briefly designated hereinbefore as "C/1" and "C/2".

Cyclic phosphonitrile chloride considering of a mixture of homologs wherein the number "n", as hereinbefore stated, has values from 3 to 10 (Melting point 75°–106° C — Cl = 60.2% — P = 26.5% — N = 11.6%) containing the trimer in an amount of at least 30% by weight of the total amount of homologs is reacted with n-butyl alcohol in the presence of anhydrous sodium carbonate.

1600 grams of normal butyl alcohol (Boiling point 117°–117.5° C) and 382 grams of anhydrous $Na_2CO_3$ are charged in a 3000 cm³ flask provided with an airtight stirrer, a drip funnel, a thermometer and a 60 cm high rectification column. The suspension is brought to boiling under stirring and is slowly distilled.

When the temperature of the vapours reaches 117.5° C, a solution consisting of 500 grams of the said cyclic phosphonitrile chloride, dissolved in 530 grams of anhydrous benzene, is added from the drip funnel in $2^h$ and 30'. The rate of the addition is controlled so as not to cause strong foaming and so that the ternary azeotrope benzene-water-n-butanol will distill concurrently. When the temperature of the vapours reaches 114°–117° C (2 hours after the end of the addition) the reaction is brought to an end by discontinuing the heating. The reaction product is concentrated under a vacuum so as to eliminate the excess of butyl alcohol; the residue, treated with water, is extracted with toluene. 675 grams of oily residue is obtained from the evaporation of the toluene. This product has the following content of the elements phosphorus, nitrogen and chlorine: P = 18.1%; N = 8.3%; Cl = 11.7%

Step (a) — Second Phase —

The product obtained by the aforesaid first phase, is reacted with an unsaturated alcohol for the purpose of the preparation of allyl-butoxy-chlorophosphazene.

The products obtained from the reaction about to be described are products of the types briefly designated hereinbefore as "CB/1" and "CB/2".

In the previous described apparatus, there are charged 540 grams of n-butoxy-chlorophosphazene (the product obtained in the first phase described above), 150 grams of anhydrous $Na_2CO_3$ and 800 grams of allyl alcohol. The mixture is distilled very slowly during $13^h$ and 30' until the temperature of the vapours reaches 116° C.

At this point the reaction is interrupted. The excess of allyl alcohol is evaporated under a vacuum; the residue is treated with toluene. 563 grams of oily product are obtained from the evaporation of the toluene. This product has the following content of elements:

P = 17.8%; N = 8.18%; Cl = 6.21%.

The number of double bonds expressed as mols of $H_2$ per gram of product, is 1.52.

Step (b)

Preparation of the copolymer "I+II"

274.2 grams of allyl derivative of butoxy-phosphazene obtained as described hereinbefore and 13.75 grams of maleic acid and charged into a 500 cc three-necked flask provided with a stirrer, a thermometer and a drip funnel. The mixture is heated to 70° C in an inert gas (nitrogen) stream and at this temperature 10.74 grams of benzoyl peroxide (containing 20–25% of water) dissolved in 30 cc of toluene are added through the drip funnel. The mass is kept under stirring for 4–6 hours, whereafter the toluene is evaporated under reduced pressure whereby a viscous liquid is obtained, which has a relative viscosity of 3.055 in a 40% solution in toluene at 20° C.

Step (c)

Preparation of the alkali salt of copolymer "I+II"

The product obtained in step (b) is treated with an aqueous 23.6% NaOH solution so as to neutralize all the —COOH groups of the polymer "I+II". A fluid mass is thus obtained, which yields, with water, solution-suspensions which are stable for several days and which are easily mixed with the cellulose xantate solutions.

Step (d)

Preparation of cellulosic fibres having a high resistance to combustion

Cellulose yarns resistant to combustion have been prepared by mixing various amount of the dispersion product obtained from Step (c) with a cellulose xantogenate solution having a 7.5% cellulose content (a solution normally used for preparing fibres). After adding the flame proofing agent, the dope has been spun in an acid-salt bath such as normally used for spinning additive-free cellulosic fibres. The fibres obtained have been subjected to the normal treatments of desulphurizing, bleaching, washing, etc. The yield in phosphorus (referred to that introduced into the dope), the weight increase of the fibre due to the flame proofing agent and the resistance to combustion have been determined on the dry fibre. The resistance to combustion has been measured by the oxygen index (O.I.) test (ASTM D-2863-70 and J. Fire and Flammability, Vol. 1, January 1970, pages 36–41), viz. the minimum ratio of oxygen in an oxygen-nitrogen mixture which is still sufficient to maintain the combustion, has been determined.

For purpose of comparison yarns have been prepared by using the compounds indicated by "A" and the same tests have been carried out on them. Samples which have oxygen indices (O.I.) 0.26–0.27 pass the Vertical Inflammability Test according to norm AATCL 34/1966.

EXAMPLE 2

This example differs from Example 1 only with reference to the first phase of Step (a), which will yields products of the types designated as "C/1" and "C/2", but wherein the alkoxy substituent is propoxy.

Preparation of n-propoxy chlorophosphazenene

The operations are carried out as Example 1, with the differrence that n-propyl alcohol is used instead of butyl alcohol 620 grams of oily product are obtained from 500 grams of phosphonitrile chloride and 1350 grams of n-propyl alcohol. The elementary analysis of the product yields the following results: P = 21.6%; N = 9/75%; CL = 20.6%

EXAMPLE 3

This example differs from Example 1 with reference to step (b), wherein acrylic acid is used as the unsaturated acid to effect the preparation of a product "I+II" obtained by copolymerizing allyl butoxy-chlorophosphazene with acrylic acid.

The operations are carried out as in Exemple 1, using (in Step b) 250 grams of allyl butoxy-chlorophsphazene, 23.5 grams of acrylic acid, and 9.5 grams of benzoyl peroxide. A semi-solid mass is obtained, which when treated with a NaOH solution yields stable solution-emulsions.

EXAMPLE 4

This example contemplates another variant of Step (b), which makes use of allysulphonic acid in the form of an alkali salt, specifically its sodium salt, to effect the preparation pf the copolymer "I+II" obtained by polymerizing allyl butoxy-chlorophosphazene with sodium allylsulphonate.

Operating as described in the corresponding step of Example 1, 20.5 grams of sodium allylsulphonate dissolved in 140 cc of dimethylformamide and 274.2 grams of allyl butoxy-phosphazene are used. At the end of the polymerization the dimethylformamide is evaporated under a vacuum, whereby a residue is obtained which is viscous in the hot and semi-solid in the cold, and the relative viscosity whereof in toluene at 40% and at 20° C is 3.31.

For the purpose of demonstrating the effects and the advantages of the invention, this description is completed by Table 2, in which a comparison is made between some parameters and results derived from various samples obtained by operating according to the various aforementioned embodiments of the invention, and with different contents of the significant compounds.

The following Table 2 comprises 11 columns, wherein there are indicated, respectively:

Col. 1 : the sequence number of the tests;

Col. 2 : the above described Example according to which the respective test has been made. The test No. 1 has been made on a conventional cellulosic fibre which does not include any flameproofing compound. This test, therefore, is a comparison test;

Col. 3 : the type of the flameproofing compound;

Col. 4 : the grams of viscose rayon having 7.5% cellulose content;

Col. 5 : the grams of alkaline flameproofing solution "I + II" or pure "A". There is also indicated, between brackets, the P%;

Col. 6 : the grams of yarn obtained from an amount of viscose dope which would yield 100 grams of cellulosic fibre, the increase in weight above 100 grams being due to the flameproofing copolymer incorporated therein;

Col. 7 : lists the phosphorus yield, that is the ratio, in percentage, of the total amount of phosphorus which is found on the fibre after spinning, to the total amount of phosphorus added to the cellulose xantogenate dope in the form of flameproofing copolymer "I + II" before spinning; the calculation being effected according to the following formula:

$$\text{Phosphorus yield} = (P \times Q/P' \times Q'),$$

wherein
P = % of phosphorus on fibre
Q = total amount of fibre obtained
P' = % of copolymer "I + II"
Q' = total amount of copolymer "I + II" added to the viscose dope prior to spinning.

Columns 8, 9 and 10 list the elementary analyses of the fibre finally obtained, limited to phosphorus, nitrogen and chlorine. In particular:

Col. 8 : the P%;
Col. 9 : the N%;
Col. 10 : the Cl%

Col. 11: lists the oxygen test, indicated as "L.O.I" and obtained as hereinbefore described.

mula $(PN\ Hal_2)_n$, wherein "$n$" is a whole number from 3 to 10.

Table 2

| Col. 1 | Col. 2 | Col. 3 | Col. 4 | (P%) | Col. 6 | Col. 7 | Col. 8 P% | Col. 9 N% | Col. 10 Cl% | Col. 11 L.O.I |
|---|---|---|---|---|---|---|---|---|---|---|
| 1 | — | | 1330 | | 100.00 | — | — | — | — | 0.18 |
| 2 | Ex. 1 | Copolymer "I+II" $R=CH_3-CH_2-CH_2-CH_2-$ $X=Cl$ | 1330 | 24.0 (14.03%) | 117.23 | 81.8 | 2.35 | 1.07 | 0.535 | 0.24 |
| 3 | Ex. 1 | " | 1330 | 28.0 (14.60%) | 119.83 | 80.6 | 2.75 | 1.36 | 0.627 | 0.26 |
| 4 | Ex. 1 | " | 1330 | 34.9 (13.74%) | 125.00 | 81.6 | 3.13 | 1.54 | 0.712 | 0.27 |
| 5 | Ex. 1 | Copolymer "I+II" $R=CH_3-CH_2-CH_2-$ $X=Cl$ | 1330 | 32.3 (18.40%) | 125.30 | 90.5 | 4.30 | 1.95 | 3.900 | 0.30 |
| 6 | Ex.2 | A $R=CH_3-CH_2-CH_2-$ $X=Cl$ | 1330 | 19.2 (21.60%) | 113.28 | 71.0 | 2.60 | 1.81 | 2.950 | 0.29 |
| 7 | Ex.1 | A $R=CH_3-CH_2-CH_2-CH_2-$ $X=Cl$ | 1330 | 27.3 (18.10%) | 121.14 | 83.3 | 3.40 | 1.58 | 1.850 | 0.29 |

We claim:

1. Improved method for the production of cellulosic fibres having a high resistance to combustion, comprising the following operations:
   a. 1. preparing a copolymerizable monomeric compound by reacting a cyclic alkoxy derivative, including still at least a halogen atom of a phosphonitrile halide, with an unsaturated alcohol;
   2. chemically transforming said halogen-containing alkoxy derivative to obtain a copolymerizable monomeric compound;
   b. copolymerizing with a free radical catalyst said monomeric compound with an unsaturated acid selected from the group consisting of maleic, acrylic, methacrylic and allylsulphonic acids, obtaining a water insoluble copolymer including acid groups and cyclic phosphonitrile groups;
   c. treating said copolymer with an aqueous-alkaline solution so as to salify the said acid groups and to obtain a solution-suspension which is mixable with viscous cellulose xantogenate solutions;
   d. adding said solution-suspension to a spinnable cellulose xantogenate viscous dope obtaining a composite viscous mass of cospinnable components, and spinning said viscous mass in an acid spinning and coagulating bath whereby to form a regenerated cellulose fibre including the said insoluble copolymer.

2. Method according to claim 1, wherein the phosphonitrile halide is a cyclic compound having the formula $(PN\ Hal_2)_n$, wherein "$n$" is a whole number from 3 to 10.

3. Method according to claim 2, wherein a mixture of cyclic phosphonitrile halides corresponding to various values of "$n$" is employed.

4. Method according to claim 2, wherein the halogen is chlorine.

5. Method according to claim 1, wherein the halogen containing alkoxy derivative of the phosphonitrile halide is prepared by reacting this latter with a saturated alcohol.

6. Method according to claim 5, wherein the saturated alcohol is propyl alcohol.

7. Method according to claim 5, wherein the saturated alcohol is butyl alcohol.

8. Method according to claim 5, wherein the unsaturated alcohol is reacted with the halogen-containing alkoxy derivative of phosphonitrile halide.

9. Method according to claim 3, wherein in the mixture of phosphonitrile halides the homolog corresponding to the value $n=3$ is present in an amount of least 30%.

10. Method according to claim 1, wherein the unsaturated acid with which the copolymerizable monomeric compound is reacted is a carboxylic acid.

11. Method according to claim 1, wherein the unsaturated acid is a sulphonic acid.

12. Method according to claim 1, wherein the aqueous-alkaline solution with which the copolymer is treated is an aqueous solution of NaOH.

13. Combustion resistant cellulosic fibre made by the process of claim 1.

* * * * *